United States Patent
Robin et al.

(10) Patent No.: US 12,250,551 B2
(45) Date of Patent: Mar. 11, 2025

(54) METHOD FOR SECURE PAIRING BETWEEN AN ON-BOARD AND REMOTE SENSOR AND CONCENTRATOR

(71) Applicant: SAFRAN ELECTRONICS & DEFENSE, Paris (FR)

(72) Inventors: Lionel Robin, Moissy Cramayel (FR); Paul Leveau, Moissy Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 382 days.

(21) Appl. No.: 17/784,433

(22) PCT Filed: Dec. 9, 2020

(86) PCT No.: PCT/FR2020/052351
§ 371 (c)(1),
(2) Date: Jun. 10, 2022

(87) PCT Pub. No.: WO2021/116603
PCT Pub. Date: Jun. 17, 2021

(65) Prior Publication Data
US 2023/0007493 A1    Jan. 5, 2023

(30) Foreign Application Priority Data
Dec. 13, 2019   (FR) ..................................... 1914337

(51) Int. Cl.
*H04L 29/06*    (2006.01)
*H04L 9/30*    (2006.01)
(Continued)

(52) U.S. Cl.
CPC ............. *H04W 12/50* (2021.01); *H04L 9/30* (2013.01); *H04W 12/033* (2021.01); *H04W 12/06* (2013.01)

(58) Field of Classification Search
CPC .... H04W 12/50; H04W 12/06; H04W 12/033
(Continued)

(56) References Cited

U.S. PATENT DOCUMENTS

| 2010/0095110 A1* | 4/2010 | Noble | ................... H04L 9/3271 380/278 |
|---|---|---|---|
| 2013/0198816 A1* | 8/2013 | Bohli | ..................... H04L 63/18 726/4 |

(Continued)

FOREIGN PATENT DOCUMENTS

| CN | 109983793 A | 7/2019 |
|---|---|---|
| EP | 2 326 114 A2 | 5/2011 |

(Continued)

OTHER PUBLICATIONS

International Search Report as issued in International Patent Application No. PCT/FR2020/052351, dated Feb. 8, 2021.

*Primary Examiner* — Brandon Hoffman
*Assistant Examiner* — Samuel Ambaye
(74) *Attorney, Agent, or Firm* — Pillsbury Winthrop Shaw Pittman LLP

(57) ABSTRACT

A method for secure pairing between a sensor and a concentrator using a mobile terminal includes generating and emitting a confirmation code by the concentrator; converting by the sensor of the confirmation code into a sequence of light signals executed by at least one light-emitting diode; converting by the mobile terminal of the sequence of light signals into a sequence code; sending the sequence code to the concentrator; comparing, by the concentrator, the sequence code and the generated confirmation code: if the sequence code does not match the generated confirmation code, generating a warning; if the sequence code matches the generated confirmation code, pairing and exchanging information between the sensor and the concentrator.

13 Claims, 2 Drawing Sheets

(51) Int. Cl.
*H04W 12/033* (2021.01)
*H04W 12/06* (2021.01)
*H04W 12/50* (2021.01)

(58) Field of Classification Search
USPC .......................................................... 713/153
See application file for complete search history.

(56) References Cited

U.S. PATENT DOCUMENTS

| | | |
|---|---|---|
| 2017/0012711 A1 | 1/2017 | Estes et al. |
| 2018/0091303 A1 | 3/2018 | Brook et al. |
| 2018/0206112 A1 | 7/2018 | Switzer et al. |
| 2020/0036443 A1* | 1/2020 | Wang ..................... H04B 10/50 |

FOREIGN PATENT DOCUMENTS

| | | |
|---|---|---|
| EP | 2 633 663 A1 | 9/2013 |
| EP | 2 633 663 B1 | 12/2018 |
| WO | WO 2012/055425 A1 | 5/2012 |
| WO | WO 2014/031660 A1 | 2/2014 |

\* cited by examiner

METHOD FOR SECURE PAIRING BETWEEN AN ON-BOARD AND REMOTE SENSOR AND CONCENTRATOR

CROSS-REFERENCE TO RELATED APPLICATIONS

This application is the U.S. National Stage of PCT/FR2020/052351, filed Dec. 9, 2020, which in turn claims priority to French patent application number 1914337 filed Dec. 13, 2019. The content of these applications are incorporated herein by reference in their entirety.

TECHNICAL FIELD OF THE INVENTION

The technical field of the invention is that of methods for pairing between a sensor and a concentrator in an on-board environment and more particularly that of methods for pairing between a sensor and a concentrator that are remote in an on-board environment and of which the data coming from the sensor has to have integrity and the origin guaranteed.

The present invention relates to a method for pairing between an on-board sensor and a concentrator and in particular a method for pairing between an on-board and remote sensor and concentrator. The present invention also relates to a sensor, a concentrator and a mobile terminal making it possible to implement the method for pairing.

TECHNOLOGICAL BACKGROUND OF THE INVENTION

In order for a concentrator, that has for role to collect in a centralised manner data coming from different sensors, to be able to collect information of which the origin and the integrity have to be guaranteed with a given sensor, a reciprocal recognition phase called pairing is indispensable.

When the concentrator and the sensor are on board a device such as an aircraft or a car, it is common that the sensor is located in a highly restrictive environment. The concentrator is placed at a distance from the sensor in a less restrictive environment.

In the case of replacing or mounting a sensor, the pairing is carried out in an operational environment, i.e. when the sensor and the concentrator are on board the device. Recourse to an NFC (Near Field Communication) component cannot therefore be considered since the distance between the sensor and the concentrator, from about a metre to several metres in the operational environment, is too substantial and cannot be reduced to a few centimetres (as the concentrator cannot be moved). Likewise, solutions that have recourse to data transport via light beams (IrDA technology for "Infrared Data Association", such as for example infrared connections) cannot be used because obstacles are present between the sensor and the concentrator.

[FIG. 1] Pairing in an operational environment is conventionally carried out by a method 10 of which the chaining of the steps is shown in FIG. 1. The method 10 is implemented by an operator located in the vicinity of the sensor 202 and provided with a human-machine interface 204 capable of communicating with the concentrator 201 via a communication mode such as Wi-Fi, 3G or 4G. During a first step 11, the operator presses a button to place the sensor 202 in pairing mode. During a second step 12, the sensor 202 emits a pairing request, a light-emitting diode 2020 of the sensor 202 blinks to indicate that it is in pairing mode. During a third step 13, the concentrator 201, in a continuous listening mode, receives the pairing request, carries out the pairing and sends a pairing confirmation to the sensor 201. During a fourth step 14, the concentrator 201 sends a pairing confirmation notification to the operator via the human-machine interface 204. The operator optionally provides data concerning the sensor 202 to the concentrator 201. The concentrator 201 and the sensor 202 are then paired. During a fifth step 15, the concentrator 201 and the sensor 202 exchange data.

According to this method, there is no guarantee that the concentrator has been paired with the correct sensor and inversely, for example, the sensor 202 is paired with another concentrator. This case can be of an unintentional origin during a pairing phase of two different devices. This method is also vulnerable to an attack of the "man in the middle" type which has for consequence to no longer guarantee the integrity of the operational device since the authenticity of the sensor or of the concentrator is no longer guaranteed. In this international context, a malicious actor from the sensor 202 standpoint, usurps the identity of the concentrator 201, and/or from a concentrator 201 standpoint usurps the identity of the sensor 202. The data exchanged between the sensor 202 and the concentrator 201 once the pairing is carried out is intercepted and modified by a third party and is then no longer confidential and has lost its integrity.

There is therefore a need for a method of secure pairing between an on-board and remote sensor and concentrator, carried out in an operational environment.

SUMMARY OF THE INVENTION

The invention offers a solution to the problems mentioned hereinabove, by making it possible to pair in an operational environment an on-board sensor and concentrator separated from one another, guaranteeing the integrity of the data exchanged.

A first aspect of the invention relates to a method for secure pairing between a sensor and a concentrator, the concentrator and the sensor being on-board and remote, the sensor comprising at least one light-emitting diode, the method being implemented using a mobile terminal configured to communicate with the concentrator via a secure channel, and comprises the following steps:

Putting the concentrator into pairing mode and emitting by the concentrator, of a so public concentrator key;

Putting the sensor into pairing mode and emitting by the sensor, of a pairing request comprising pairing information encrypted with the public concentrator key, and a public sensor key;

Generating, by the concentrator, of a confirmation code and emitting of a pairing request confirmation comprising confirmed pairing information and the generated confirmation code, the pairing request confirmation being encrypted with the public sensor key;

Converting by the sensor, of the confirmation code received into a sequence of light signals and execution of the sequence of light signals by the light-emitting diode;

Converting by the mobile terminal, of the sequence of light signals executed into a sequence of light signals confirmation code;

Sending by the mobile terminal via the secure channel, of the sequence of light signals confirmation code to the concentrator;

Comparing, by means of the concentrator, the sequence of light signals confirmation code and the generated confirmation code:

Deactivating of the confirmation code by the concentrator and:

If the sequence of light signals confirmation code does not match the generated confirmation code, generating a warning via the mobile terminal and deleting by the concentrator of the pairing information;

If the sequence of light signals confirmation code matches the generated confirmation code, pairing of the sensor and of the concentrator using pairing information and exchanging information between the sensor and the concentrator.

Thanks to the invention, using a confirmation code transmitted first from the concentrator to the sensor then from the sensor to the concentrator makes it possible via comparison with the confirmation code stored in the concentrator to detect a non-compliant pairing operation, whether caused by fraud or an involuntary error, such as for example a pairing attempt with an incorrect sensor. Generating a warning makes it possible to inform the operator carrying out the pairing operation of the failure of the pairing operation.

The confirmation code being transmitted from the sensor to the concentrator via a mobile terminal communicating with the concentrator via a secure channel makes it possible to secure the transmission of the confirmation code from the mobile terminal to the concentrator and using a sequence of light signals to communicate the confirmation code from the sensor to the mobile terminal makes it possible to secure the transmission of the confirmation code from the sensor to the mobile terminal since, in order to acquire or enter the sequence of light signals, a malicious person has to be in the vicinity of the sensor and therefore of the operator. A malicious person therefore cannot at a distance intercept the confirmation code during the transmission thereof from the sensor to the concentrator and usurping the identity of the sensor or of the concentrator by intercepting the confirmation code during the transmission thereof from the concentrator to the sensor is not possible since if no confirmation code or if a modified confirmation code is sent to the concentrator, the pairing will not take place.

Encrypting the data exchanged between the sensor and the concentrator before pairing makes it possible to secure the data exchanges before pairing.

In addition to the characteristics that have just been mentioned in the preceding paragraph, the method according to the first aspect of the invention can have one or more additional characteristics among the following, taken individually or in any technically permissible combination.

According to an embodiment, the mobile terminal communicates with the concentrator via a short-range communication mode.

Thus, a malicious person would have to be in the vicinity of the concentrator and of the mobile terminal in order to intercept the communications between the mobile terminal and the concentrator.

According to an embodiment compatible with the preceding embodiment, putting the concentrator into pairing mode is carried out by an operator via the mobile terminal.

Thus, the operator located in the vicinity of the sensor can put the concentrator into pairing mode at a distance from the concentrator.

According to an embodiment compatible with the preceding embodiments, putting the sensor into pairing mode is carried out by an operator by pressing a pairing button of the sensor.

Thus, the operator located in the vicinity of the sensor can easily put the sensor into pairing mode.

According to an embodiment compatible with the preceding embodiments, the pairing request is emitted in a loop in the form of radiofrequency frames by the sensor.

Thus, the chances of the concentrator receiving the pairing request are maximised with respect to a single send.

According to an embodiment compatible with the preceding embodiments, the pairing request confirmation further comprises a shared key and the information exchanged between the sensor and the concentrator is encrypted with the shared key once the sensor and the concentrator are paired.

Thus, the data exchanges between the paired sensor and the concentrator are secure and a procedure for defining keys for the exchanges of keys after pairing is avoided.

According to an embodiment compatible with the preceding embodiments, the confirmation code is randomly generated by the concentrator.

Thus, the concentrator does not store beforehand a list of useable confirmation codes that can be obtained by a malicious person.

According to an embodiment compatible with the preceding embodiments, the sequence of light signals emitted by the light-emitting diode comprises light signals of different wavelengths.

Thus, each light-emitting diode of the sensor can use a larger number of sequences of light signals.

According to a first embodiment compatible with the preceding embodiments, converting the sequence of light signals executed into a sequence of light signals confirmation code comprises entering by an operator, of the sequence of light signals via a human-machine interface of the mobile terminal and converting by the mobile terminal of the sequence of light signals entered into a sequence of light signals confirmation code.

Thus, the mobile terminal can be devoid of a camera and the operator can verify and/or modify the sequence of light signals entered.

According to a second embodiment compatible with the preceding embodiments, converting the sequence of light signals executed into a sequence of light signals confirmation code comprises acquiring the sequence of light signals by a camera of the mobile terminal and converting by the mobile terminal of the sequence of light signals acquired into a sequence of light signals confirmation code.

Thus, acquiring the sequence of light signals is not subject to human errors contrary to the first embodiment, but the operator cannot verify and/or modify the sequence of light signals acquired.

According to an embodiment compatible with the preceding embodiments, the method of the invention further comprises a step of sending, from the mobile terminal to the concentrator via the secure channel, data entered by an operator via a human-machine interface of the mobile terminal, the data entered being deleted by the concentrator if the sequence of light signals confirmation code does not match the generated confirmation code and used for the pairing and retained by the concentrator if the sequence of light signals confirmation code matches the generated confirmation code.

Thus, if the pairing requires data to be entered by an operator, this data is supplied to the concentrator in a secure way.

According to an embodiment compatible with the preceding embodiments, the method of the invention further comprises a step of sending, from the concentrator to the mobile terminal via the secure channel, a pairing confirmation.

Thus, operator is informed of the success of the pairing operation.

A second aspect of the invention relates to a mobile terminal for the implementation of the method according to the first aspect of the invention comprising a human-machine interface and being configured to:
- manage data entered via the human-machine interface;
- exchange data with a concentrator via a secure channel;
- convert a sequence of light signals executed by a sensor into a sequence of light signals confirmation code;
- generate a warning in the case where the sequence of light signals confirmation code does not match a confirmation code generated by the concentrator.

Thus, the mobile terminal is configured to implement the steps of the first embodiment of the method of the invention implemented by or via the mobile terminal.

According to an embodiment, the mobile terminal comprises a camera and is configured to acquire the sequence of light signals via the camera.

Thus, the mobile terminal is configured to implement the steps of the first or of the second embodiment of the method of the invention implemented by or via the mobile terminal.

A third aspect of the invention relates to a sensor for the implementation of the method according to the first aspect of the invention, comprising at least one light-emitting diode and being configured to:
- generate cryptographic keys;
- emit a pairing request when it is put into pairing mode;
- receive a pairing request confirmation comprising a confirmation code from a concentrator;
- convert the confirmation code received from the concentrator into a sequence of light signals;
- execute the sequence of light signals via the light-emitting diode;
- exchange information with the concentrator once paired with the concentrator.

Thus, the sensor is configured to implement the steps of the method of the invention implemented by or via the sensor.

A fourth aspect of the invention relates to a concentrator for the implementation of the method according to the first aspect of the invention, configured to:
- generate cryptographic keys;
- emit a public key when it is put into pairing mode;
- generate a confirmation code and emit a pairing request confirmation comprising the confirmation code generated upon reception of a pairing request from a sensor;
- exchange data with a mobile terminal via a secure channel;
- compare a sequence of light signals confirmation code received from the mobile terminal and the generated confirmation code;
- delete data in the case where the sequence of light signals confirmation code does not match the generated confirmation code;
- exchange information with the sensor once paired with the sensor.

Thus, the concentrator is configured to implement the steps of the method of the invention implemented by or via the concentrator.

A fifth aspect of the invention relates to a system for the implementation of the method according to the first aspect of the invention, comprising:
- a mobile terminal according to the second aspect of the invention;
- a sensor according to the third aspect of the invention;
- a concentrator according to the fourth aspect of the invention.

The invention and its different applications shall be better understood when reading the following description and examining the accompanying figures.

BRIEF DESCRIPTION OF THE FIGURES

The figures are presented for the purposes of information and in no way limit the invention.

DETAILED DESCRIPTION

Unless mentioned otherwise, the same element that appears in different figures has a unique reference.

Figure 1:
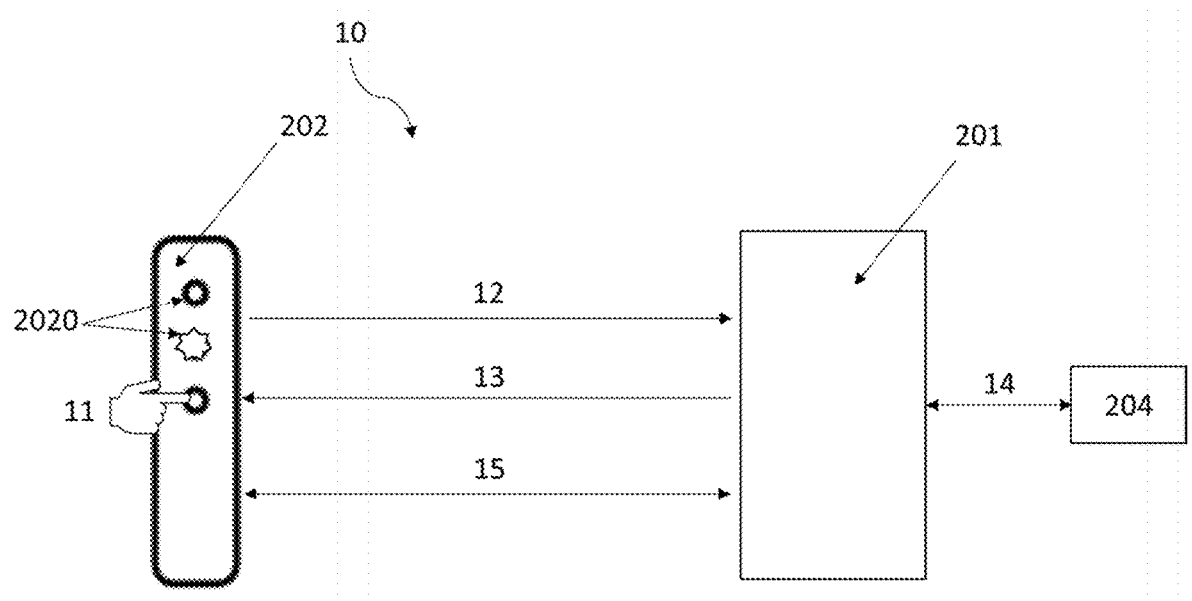
FIG. 1 shows the chaining of the steps of the pairing method between a sensor and a concentrator according to the state of the art.

FIG. 1 has already been described in reference to the prior art.

A first aspect of the invention relates to a method for secure pairing between an on-board sensor and concentrator that are distant from one another.

The term "pairing between two devices" means the reciprocal recognition phase between the two devices, required so that the data can, once the pairing is carried out, be exchanged with integrity and with a guarantee of origin between the two devices. Pairing comprises for example the exchanging of encryption keys that will be used to encrypt the data exchanged once the pairing is carried out, or the exchanging of information concerning the type of data that will be exchanged once the pairing is carried out.

Thus, in the context of the invention, if the sensor is a pressure sensor, the concentrator is informed that the data that will be transmitted by the sensor will be pressure data, not, for example, temperature data, and the concentrator can then consequently adapt the data processing.

The term "concentrator" means a device configured to collect data coming from a plurality of other devices, such as sensors, and manage the collected data.

The concentrator comprises a memory that allows it to store data and a processor that allows it to perform calculations.

The sensor comprises at least one light-emitting diode.

Each light-emitting diode can for example emit a light signal at different wavelengths. Thus, a light-emitting diode is for example capable of emitting a green light signal and a red light signal.

A light-emitting diode is for example capable of emitting in each colour of the visible range, for example in each colour of the rainbow.

A light-emitting diode is for example capable of emitting a light signal in a wavelength that does not belong to the visible range, for example in the infrared range.

The sensor is for example a pressure sensor, a temperature sensor, a light sensor or an acoustic sensor.

In the context of the invention, "the sensor and the concentrator are remote" means that the distance that separates the sensor and the concentrator is such that a malicious person can position themselves between the sensor and the concentrator without being seen from the location of the sensor. The distance that separates the sensor and the concentrator is for example greater than about ten metres.

The sensor and the concentrator are both devoid of a human-machine interface.

The term "human-machine interface" means an interface that allows for two-way interaction between a device equipped with the human-machine interface and an operator. According to this definition, a button is not a human-machine interface since a button does not allow the device equipped with the button to interact with an operator and since no information is sent by the button.

The sensor and the concentrator are on board a device that is, for example, a vehicle and more particularly an aircraft.

Figure 3:
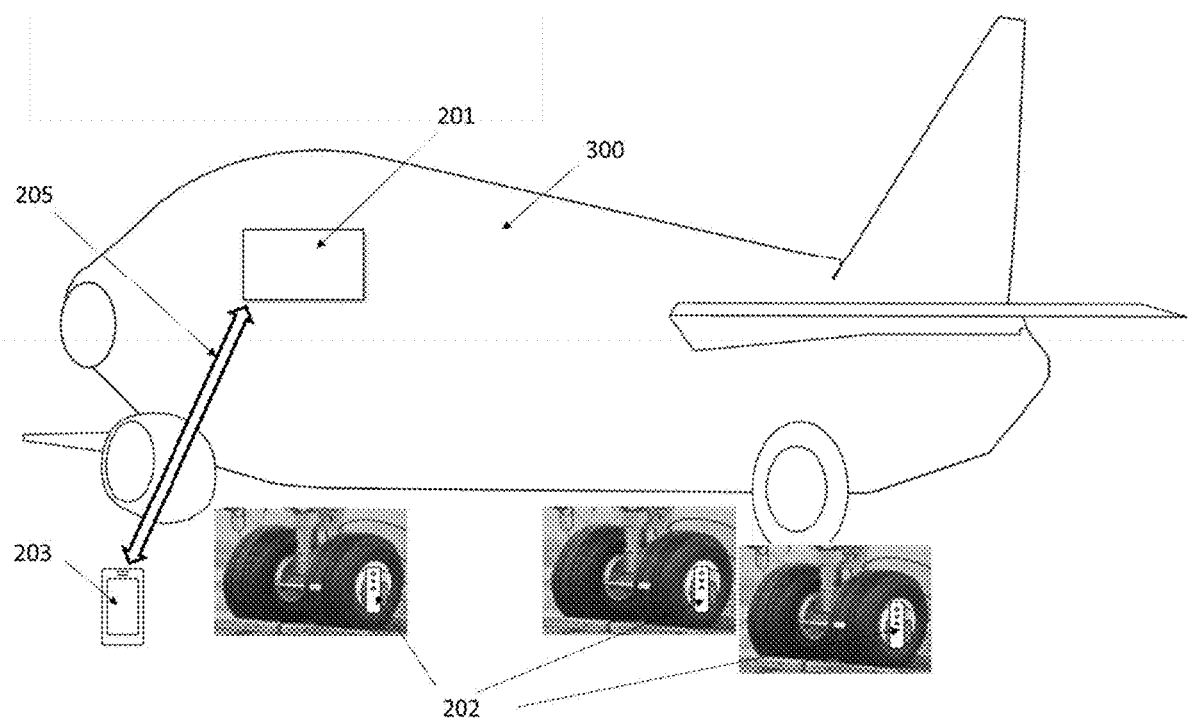
FIG. 3 shows a diagrammatical representation of an aircraft with a sensor and a concentrator on board.

FIG. 3 shows a diagrammatical representation of the case where the concentrator 201 and the sensor 202 are on board an aircraft 300.

In the example shown in FIG. 3, the aircraft 300 has on board a concentrator 201 and a plurality of sensors 202. The concentrator 201 is located inside the aircraft 300 while each sensor 202 is located at a wheel of a landing gear. The sensors 202 are for example pressure sensors giving the pressure of the wheel on which they are mounted. A given sensor 202 is then separated by several metres from the concentrator 201.

The method of the invention is implemented using a mobile terminal 203, playing the role of a trusted entity, communicating with the concentrator 201 via a secure channel 205.

The term "secure channel" means a channel allowing for the transmission of a flow of data that is encrypted, authenticated and that has integrity.

The secure channel 205 uses for example a security protocol based on TCP/IP (Transmission Control Protocol/Internet Protocol), for example a VPN (Virtual Private Network) of the SSL (Secure Sockets Layer) or IPSec (Internet Protocol Security) type or an application flow of the HTTPS (HyperText Transfer Protocol Secure) type.

The mobile terminal 203 comprises a human-machine interface 203 that allows for keying data and reading data.

The mobile terminal 203 is for example a smartphone or a tablet. The human-machine interface of the mobile terminal 203 is then for example a keypad or a touchscreen.

The mobile terminal 203 can comprise a camera.

The mobile terminal 203 and the concentrator 201 communicate via the secure channel 205, for example by using a short-range secure communication mode, such as for example a WIFI, Bluetooth or LoRa connection.

Figure 2:
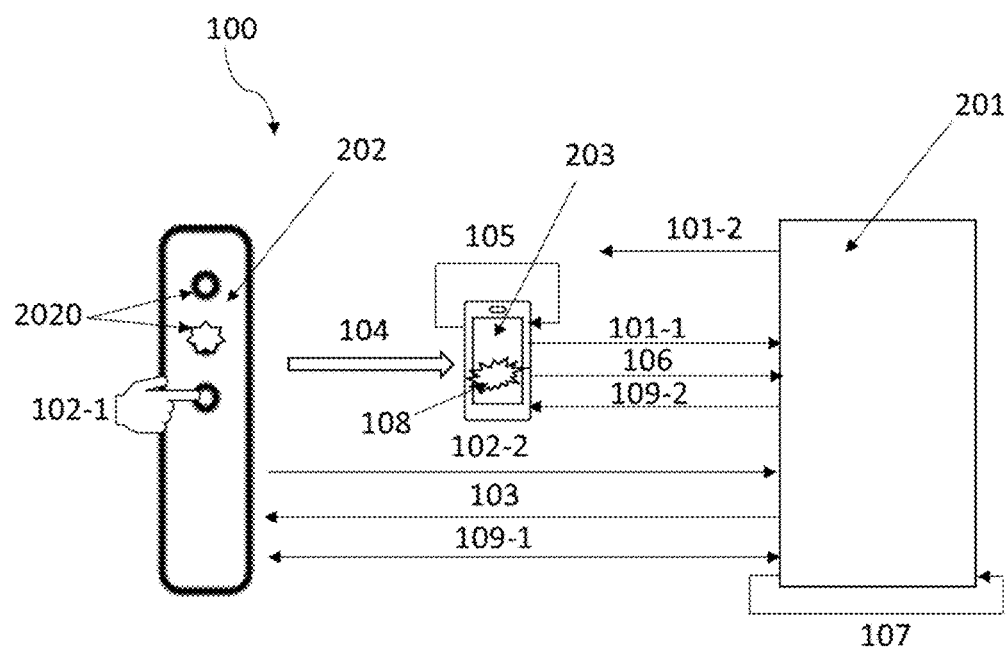
FIG. 2 shows the chaining of the steps of the pairing method between a sensor and a concentrator according to the invention, using a mobile terminal.

FIG. 2 shows the chaining of the steps of the method 100 of the invention, implemented by the concentrator 201, the sensor 202 or the mobile terminal 203, or by an operator via the concentrator 201, the sensor 202 or the mobile terminal 203.

During the implementation of the method 100, the operator is located in the vicinity of the sensor 202 and is equipped with the mobile terminal 203.

A first step of the method 100 comprises a first substep 101-1 implemented by the operator, consisting of placing the concentrator 201 in pairing mode.

As shown in FIG. 2, putting the concentrator into pairing mode 201 can be carried out by the operator using the mobile terminal 203, for example to send an instruction of putting into pairing mode to the concentrator 201 via the secure channel 205.

The first step of the method 100 also comprises a second substep 101-2 implemented by the concentrator 201, consisting of emitting a public concentrator key. The public concentrator key is for example emitted by radiofrequency.

The term "public key" means a cryptographic key used for encrypting data in the technique of asymmetric cryptographic encryption. For a given entity, a public key is coupled with a private key used for the decrypting of data encrypted with the public key. The public key can be transmitted without restriction while the private key is secret, i.e. the private key is known only to the entity.

The public concentrator key is then the public key used by the concentrator 201 to encrypt the data sent before the pairing. The public concentrator key is coupled to a private concentrator key that is known solely by the concentrator 201.

A second step of the method 100 comprises a first substep 102-1 implemented by an operator, consisting of placing the sensor 202 in pairing mode.

As shown in FIG. 2, putting the sensor into pairing mode 202 can be carried out by an operator pressing a pairing button of the sensor 202. In this case, the sensor 202 is provided with a pairing button configured to place the sensor 202 in pairing mode after a press.

The second step of the method 100 comprises a second substep 102-2 consisting, for the sensor 202, of emitting a pairing request after receiving the public concentrator key emitted at the second substep 101-2 of the first step of the method 100.

The pairing request comprises pairing information required for the pairing, encrypted using the public concentrator key.

The pairing information contains for example the position and the name of the sensor 202.

The pairing request also comprises a public sensor key.

The public sensor key is the public key used by the sensor 202 to encrypt the data send before pairing. The public sensor key is coupled to a private sensor key known only by the sensor 202.

Emitting the pairing request is for example carried out in a loop and in the form of radiofrequency frames.

A third step 103 of the method 100 is implemented by the concentrator 201 upon reception of the pairing request emitted by the sensor 202 during the second substep 102-2 of the second step of the method 100, the pairing information having been decrypted using the private concentrator key.

The pairing information is stored in the memory of the concentrator 201.

The third step 103 of the method 100 consists of generating a confirmation code and of emitting a pairing request confirmation. The pairing request confirmation is for example emitted by WIFI, Bluetooth or LoRa.

The pairing request confirmation comprises pairing information received in the confirmed pairing request and the generated confirmation code.

The pairing request confirmation is encrypted with the public sensor key received in the pairing request.

The confirmation code is for example generated randomly, for example by a random number generator used in cryptographic functions called PRNG (PseudoRandom Number Generator) or generated from information received in the pairing request.

The length of the confirmation code depends on the number of light-emitting diodes 2020 of the sensor 202 as well as the characteristics of the light-emitting diodes 2020, such as for example the number of wavelengths at which they can each emit a light signal.

In FIG. 2, the sensor 202 comprises two light-emitting diodes 2020.

A fourth step 104 of the method 100 is implemented by the sensor 202 after receiving the pairing request confirmation and therefore the confirmation code, the pairing request confirmation having been decrypted using the private sensor key.

The fourth step 104 of the method 100 consists of converting the confirmation code received into a sequence of light signals and of executing the sequence of light signals via the light-emitting diode or diodes 2020 of the sensor 202.

The sequence of light signals can be dynamic. The term "sequence of light signals" then means an ordered sequence of light signals that can have different durations and different wavelengths.

For example, in the case where the sensor 202 comprises a first light-emitting diode 2020 and a second light-emitting diode 2020, executing the sequence of light signals comprises for example lighting the first light-emitting diode 2020 for 1 second with a green colour, then lighting the second light-emitting diode 2020 for 2 seconds with a red colour.

The sequence of light signals can be static. The term "sequence of light signals" then means a visual diagram of light signals that can have different wavelengths.

For example, in the case where the sensor 202 comprises a first light-emitting diode 2020 and a second light-emitting diode 2020, executing the sequence of light signals comprises for example the simultaneous lighting of the first light-emitting diode 2020 with a green colour and of the second light-emitting diode 2020 with a red colour for a predefined duration.

A fifth step 105 of the method 100 implemented by the mobile terminal 203, consists of converting the sequence of light signals executed by the sensor 202 in the fourth step 104 of the method 100 into a sequence of light signals confirmation code.

According to a first embodiment, the sequence of light signals is entered manually by an operator via the human-machine interface of the mobile terminal 203 and the mobile terminal 203 converts the entered sequence of light signals into a sequence of light signals confirmation code. In this case, the wavelengths of the light-emitting diodes 2020 executed in the sequence of light signals must belong to the visible range.

According to a second embodiment, the sequence of light signals is acquired via the camera of the mobile terminal 203 and the mobile terminal 203 converts the acquired sequence of light signals into a sequence of light signals confirmation code.

In the two embodiments, the mobile terminal 203 carries out the inverse operation of the conversion carried out by the sensor 202 in the fourth step 104 of the method 100.

A sixth step 106 of the method 100 implemented by the mobile terminal 203 consists of sending the sequence of light signals confirmation code obtained at the fifth step 105 of the method 100 to the concentrator 201 via the secure channel 205.

A seventh step 107 of the method 100 implemented by the concentrator 201 consists of comparing the sequence of light signals confirmation code received in the sixth step 106 of the method 100 and the confirmation code generated at the third step 103 of the method 100.

If the sequence of light signals confirmation code does not match the generated confirmation code, i.e. if the sequence of light signals confirmation code is not identical to the generated confirmation code, an eighth step 108 of the method 100 is carried out.

If the sequence of light signals confirmation code matches the generated confirmation code, i.e. if the sequence of light signals confirmation code is identical to the generated confirmation code, a ninth step of the method 100 is carried out.

The eighth step 108 of the method 100 consists for the mobile terminal 203 of generating a warning and for the concentrator 201 of deactivating the confirmation code and of deleting the pairing information from its memory. The operator is then informed of the failure of the pairing.

Once the confirmation code is deactivated by the concentrator 201, the confirmation code can no longer be used to pair the concentrator 201 and the sensor 202.

The ninth step of the method 100 comprises a first substep 109-1 consisting for the concentrator 201 of deactivating the confirmation code, then for the concentrator 201 and the sensor 202 of pairing using pairing information, then exchanging information.

The information exchanged is for example encrypted using a shared key. The shared key was for example sent by the concentrator 201 to the sensor 202 in the pairing request confirmation, during the third step 103 of the method 100.

The term "shared key" means a cryptographic key used for the encryption and the decryption of data by several entities in the technique of symmetric cryptography encryption.

The ninth step of the method 100 can also comprise a second substep 109-2 implemented by the concentrator 201, consisting of sending a pairing confirmation to the mobile terminal 203 via the secure channel 205. The operator is then informed of the success of the pairing.

The method 100 can then comprise a step implemented by the mobile terminal 203, consisting of sending to the concentrator 201 via the secure channel 205, data that was entered by the operator via a human-machine interface of the mobile terminal 203, required for the pairing of the concentrator 201 and of the sensor 202.

The data entered is stored in the memory of the concentrator 201.

The data entered comprises for example the position of the sensor 202 and/or the identification of the device 300 on which the sensor 202 is on board.

In the case of FIG. 3, the data entered comprises for example the position of the sensor 202 in the reference framework of the aircraft 300 and the identification of the aircraft 300.

As the data entered is required for the pairing of the concentrator 201 and of the sensor 202, the entered data is used for the pairing of the concentrator 201 and of the sensor 202 during the first substep 109-1 of the ninth step of the method 100 or deleted by the concentrator 201 from its memory during the eighth step 108 of the method 100.

The invention claimed is:

1. A method for secure pairing between a sensor and a concentrator, the concentrator and the sensor being on-board and remote, the sensor comprising at least one light-emitting diode, the method being implemented using a mobile terminal configured to communicate with the concentrator via a secure channel, and comprises:

putting the concentrator into pairing mode and emitting by the concentrator, a public concentrator key;

putting the sensor into pairing mode and emitting by the sensor, a pairing request comprising pairing information encrypted with the public concentrator key, and a public sensor key;

generating, by the concentrator, a confirmation code and emitting a pairing request confirmation comprising confirmed pairing information and the generated confirmation code, the pairing request confirmation being encrypted with the public sensor key;

converting by the sensor, the confirmation code received into a sequence of light signals and execution of the sequence of light signals by the light-emitting diode;

converting by the mobile terminal, the sequence of light signals executed into a sequence of light signals confirmation code;

sending by the mobile terminal via the secure channel, the sequence of light signals confirmation code to the concentrator;

comparing, by the concentrator, the sequence of light signals confirmation code and the generated confirmation code:

deactivating the confirmation code by the concentrator and:

if the sequence of light signals confirmation code does not match the generated confirmation code, generating a warning via the mobile terminal and deleting by the concentrator of the pairing information; and if the sequence of light signals confirmation code matches the generated confirmation code, pairing of the sensor and of the concentrator using pairing information and exchanging information between the sensor and the concentrator.

2. The method according to claim 1, wherein the mobile terminal communicates with the concentrator via a short-range communication mode.

3. The method according to claim 1, wherein putting the concentrator into pairing mode is carried out by an operator via the mobile terminal and putting the sensor into pairing mode is carried out by an operator by pressing a pairing button of the sensor.

4. The method according to claim 1, wherein the pairing request is emitted in a loop in the form of radiofrequency frames by the sensor.

5. The method according to claim 1, wherein the pairing request confirmation further comprises a shared key and the information exchanged between the sensor and the concentrator is encrypted with the shared key once the sensor and the concentrator are paired.

6. The method according to claim 1, wherein the confirmation code is randomly generated by the concentrator.

7. The method according to claim 1, wherein the sequence of light signals emitted by the light-emitting diode comprises light signals of different wavelengths.

8. The method according to claim 1, wherein the conversion of the sequence of light signals executed into a sequence of light signals confirmation code comprises:

entering by an operator, of the sequence of light signals via a human-machine interface of the mobile terminal and converting by the mobile terminal of the sequence of light signals entered into a sequence of light signals confirmation code; or acquiring the sequence of light signals by a camera of the mobile terminal and converting by the mobile terminal of the sequence of light signals acquired into a sequence of light signals confirmation code.

9. The method according to claim 1, further comprising sending, from the mobile terminal to the concentrator via the secure channel, data entered by an operator via a human-machine interface of the mobile terminal, the data entered being deleted by the concentrator if the sequence of light signals confirmation code does not match the generated confirmation code and used for the pairing and retained by the concentrator if the sequence of light signals confirmation code matches the generated confirmation code.

10. The method according to claim 1, further comprising sending, from the concentrator to the mobile terminal via the secure channel, a pairing confirmation.

11. A terminal mobile for the implementation of the method according to claim 1, comprising a human-machine interface and being configured to:

manage data entered via the human-machine interface;

exchange data with a concentrator via a secure channel;

convert a sequence of light signals executed by a sensor into a sequence of light signals confirmation code; and generate a warning in the case where the sequence of light signals confirmation code does not match a confirmation code generated by the concentrator.

12. A terminal mobile according to claim 11, comprising a camera and configured to acquire the sequence of light signals via the camera.

13. A system, comprising:

a mobile terminal according to claim 11, a sensor comprising at least one light-emitting diode;

a concentrator;

the sensor being configured to:

generate cryptographic keys;

emit a pairing request when it is put into pairing mode;

receive a pairing request confirmation comprising a confirmation code from the concentrator;

convert the confirmation code received from the concentrator into a sequence of light signals;

execute the sequence of light signals via the light-emitting diode;

exchange information with the concentrator once paired with the concentrator;

the concentrator being configured to:

generate cryptographic keys;

emit a public key when it is put into pairing mode;

generate a confirmation code and emit a pairing request confirmation comprising the confirmation code generated upon reception of a pairing request from the sensor;

exchange data with the mobile terminal via a secure channel;

compare a sequence of light signals confirmation code received from the mobile terminal and the generated confirmation code;

delete data in the case where the sequence of light signals confirmation code does not match the generated confirmation code; and exchange information with the sensor once paired with the sensor.

* * * * *